United States Patent [19]

Buhlmann

[11] 4,152,196

[45] May 1, 1979

[54] STRIPPING COLUMN

[75] Inventor: Ulrich Buhlmann, Effretikon, Switzerland

[73] Assignee: Sulzer Brothers Limited, Winterthur, Switzerland

[21] Appl. No.: 762,244

[22] Filed: Jan. 25, 1977

[30] Foreign Application Priority Data

Mar. 15, 1976 [CH] Switzerland ............................ 3170/76

[51] Int. Cl.² ............................................. B01D 1/14
[52] U.S. Cl. ............................ 159/16 S; 159/DIG. 8; 159/29; 261/21; 159/18; 159/20 R
[58] Field of Search ................. 159/16 S, 29, DIG. 8, 159/18, 20 R; 202/158; 203/96; 261/21, DIG. 76

[56] References Cited

U.S. PATENT DOCUMENTS

| | | | |
|---|---|---|---|
| 1,616,209 | 2/1927 | Weisgerber | 159/16 S |
| 2,356,628 | 8/1944 | Stalman | 261/21 |
| 3,421,567 | 1/1969 | Hoppe | 159/16 S |
| 3,737,378 | 6/1973 | Mori et al. | 159/16 S |

*Primary Examiner*—Norman Yudkoff
*Attorney, Agent, or Firm*—Kenyon & Kenyon, Reilly, Carr & Chapin

[57] ABSTRACT

The column employs a head section with a counterflow column, a bottom section with a counterflow column and a plurality of reaction stages for stripping metal salts via steam from ammoniacal solutions or suspensions. Each reaction stage has a floor, a pipe defining a laterally confined chamber, an outlet and a valve in the outlet to control the discharge of liquid. At least one steam line communicates the upper end of each stage with the pipe in the next uppermost stage. Incrustation of the column by the stripped salts is reduced by the high velocity of flow in the bubble bed in each stage.

13 Claims, 4 Drawing Figures

STRIPPING COLUMN

This invention relates to a stripping column. More particularly, this invention relates to a stripping column for precipitating metal salts from ammoniacal solutions or suspensions produced in ammoniacal leaching processes.

Heretofore, various types of stripping columns and the like have been known for liquids in the form of solutions of suspensions. In many cases, these stripping columns have been used for precipitating metal salts by means of steam from ammoniacal solutions or suspensions which are produced in ammoniacal leaching processes. In such cases, the liquid to be stripped is fed into the head part of the column and steam into a bottom part. The remainder of the column is subdivided into several stages by separating walls in the form of plates with outlets disposed in the plates for delivering the liquid from one stage to the next lowermost stage.

Customarily, when stripping a substance with a lower boiling point from a mixture, use is made of a vapor of a substance having a higher boiling point, for example, steam. Further, such columns are generally provided with various types of components for enlarging the mass exchange surfaces. These components may, for instance, be in the form of exchange plates or in the form of packed beds.

However, it has been found that the material which is precipitated during a stripping operation and, particularly during a mass exchange operation, adheres to the column components or distribution devices and leads to incrustation on these components and devices. As a result, the column becomes clogged up after a certain operating time and can only be returned to operation after cleaning. Usually, these incrustations of precipitated material occur at the fixed walls of the column and, particularly, in the reaction zone where the precipitation originates; on the walls of the column or on the surfaces of the built-in components, should these come into alternate contact with steam and liquid; at the walls of the column or the plates when the flow velocity of the liquid is relatively low; and when the walls are at temperatures which are higher than the boiling temperature of the liquid solution.

Accordingly, it is an object of the invention to provide a stripping column in which incrustations are avoided.

It is another object of the invention to increase the operational life of stripping columns.

It is another object of the invention to reduce the amount of maintenance required for operating stripping columns.

Briefly, the invention provides a stripping column having a head section for receiving a metal-salt-containing liquid, a bottom section for receiving a supply of steam and a plurality of reaction stages disposed between the head section and bottom section to define bubble beds therein. Each stage includes a separating plate which defines a floor of a respective bubble bed, means such as a draft tube or pipe defining a laterally defined chamber within a respective bubble bed above the floor, an outlet in the separating plate to discharge liquid and means for controlling the discharge of liquid through the outlet. In addition, at least one line communicates an upper end of each respective stage with the chamber of the next uppermost stage in order to convey a flow of steam from the upper end of one stage to the chamber in the next uppermost stage.

The stripping column thus conducts the liquid and the steam from stage-to-stage in a separated manner. As a result, incrustations are avoided within the column and particularly within the bubble beds.

The lines which conduct the steam, i.e. steam pipes, can have relatively large cross-sections. As a result, the steam can be distributed in each stage with little pressure loss contrary to the known steam distribution pipes which have small discharge openings. For this reason, no additional transport means are required for transporting the steam or the liquid from stage-to-stage.

During use, a uniform upwardly directed movement of the liquid-steam mixture occurs within the laterally confined chambers within the bubble beds. This, in turn, causes the liquid to circulate in the bubble bed at relatively high flow velocity. This high flow velocity prevents the formation of incrustations on the fixed walls of the column and the separation plates as well as on any components arranged in the bubble beds.

The means defining the laterally confined chambers within the bubble beds may be in the form of pipes into which the steam is introduced into the liquid.

In addition, various stationary mixing elements may be disposed within the laterally confined chambers. Such elements can be of known construction and are used to form stable mixtures, for example as described in Swiss Pat. Nos. 537,208 and 547,120.

As no steam is present in the liquid runoff from each of the individual stages, no significant precipitation takes place in the regions of the outlets of each stage.

The stripping column may also be constructed with thermal insulation about the steam lines, separating plates and outlets. Alternatively, a stripping column may be provided with a cooling means to cool the steam lines, separating plates and outlets. In addition, the separating plate may be funnel-shape with the outlet disposed in the lower portion of the plate in order to prevent incrustations in places with low flow velocities.

In one embodiment, the head section and bottom section are each provided with a counterflow column. In this embodiment, a feed line is connected to the counterflow column in the head section to feed a metal-salt containing liquid thereto and a discharge line to discharge steam therefrom. Similarly, a feed line is connected to the counterflow column in the bottom section to feed steam thereto while a discharge line is connected to the counterflow column to discharge stripped liquid therefrom. These counterflow columns may include packings, such as Raschig rings or the like, or may be constructed as bell or perforated bottom columns, in order to separate volatile substances, such as ammonia and carbon dioxide in the case of ammoniacal solutions, from the liquid without precipitating solids.

These and other objects and advantages of the invention will become more apparent from the following detailed description and appended claims taken in conjunction with the accompanying drawings in which:

Figure 1:
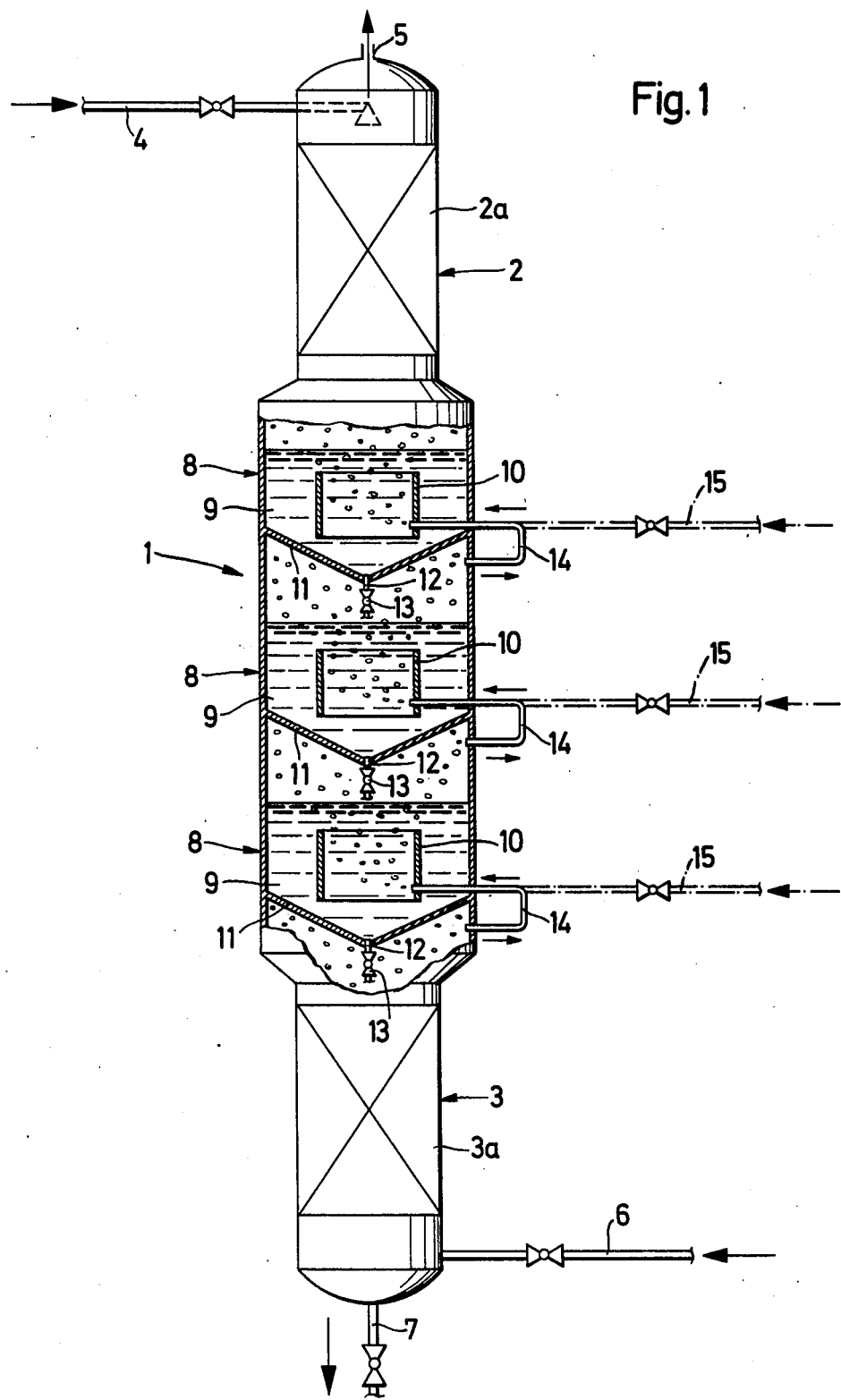
FIG. 1 illustrates a schematic view of a longitudinal cross-section of a stripping column according to the invention.

Referring to FIG. 1, the stripping column 1 has a head section 2 for receiving a liquid, for example, a metal salt-containing liquid via a feed line 4 and a bottom section 3 for receiving a supply of steam via a feed line 6. Each of the sections 2, 3 is provided with a counterflow column 2a, 3a of known construction. In addition, a discharge line 5 is connected to the counterflow column 2a to discharge steam therefrom. In similar fashion, a discharge line 7 is connected to the counterflow column 3a to discharge stripped liquid therefrom.

In the event that the head section 2 is not provided, the feed line 4 may be directly connected to the remainder of the column 1. Similarly, if the bottom section 3 is not provided, the live steam line 6 may be directly connected to the bottom of the remaining section of the stripping column 1.

A plurality of reaction stages 8 are disposed between the head section 2 and the bottom section 3 to define bubble beds 9 therein. Each stage includes a funnel-shaped separating plate 11 which defines a floor of the bubble bed 9 and a means, such as a draft tube or pipe 10 which defines a laterally confined chamber within a respective bubble bed 9 above the floor 11. In addition, an outlet 12 is provided in each plate 11 to discharge liquid and a means such as a valve 13 is disposed in each outlet 12 for controlling a discharge of liquid through the outlet 12. Alternatively, the outlets 12 may have throttling devices instead of valves for adjusting the quantity of run-off liquid.

At least one line 14 communicates an upper end of each stage 8 with the chamber within the pipe 10 of the next uppermost stage 8 in order to convey a flow of steam from the upper end of one stage 8 to the chamber in the next uppermost stage 8. Optionally, additional steam can be fed into the individual steam lines 14 via lines 15 which are controlled with suitable valves.

As shown in FIG. 1, the steam lines 14 are advantageously run outside the stripping column. In some cases, these lines may also be arranged inside the column 1.

In the following, the operation of the stripping column will be explained by way of an embodiment example.

Assume that ammonia and carbon dioxide are to be stripped from an ammoniacal ammonium carbonate solution along with the metals dissolved therein, such as nickel, zinc or copper, by means of steam. For this purpose, the liquid is fed into the separating or counterflow column 2 via the feed line 4. Within this counterflow column, part of the ammonia and carbon dioxide contained in the liquid is separated out by mass exchange between the liquid and steam flowing in the opposite direction and leaving the bubble bed stages 8 of the column 1. Thereafter, the basic metal carbonates are precipitated from the liquid in the various bubble bed stages 8 by means of steam fed into the individual stages 8.

For the reasons described above, incrustations due to the precipitated solids are avoided within the stages 8 which make up the bubble bed column so that proper operation of the column is ensured and so that the suspension can flow downward in an unimpeded manner from stage-to-stage via the outlets 12.

In the lower separating or counterflow column 3, the residual amounts of ammonia and carbon dioxide are separated from the suspension by mass exchange with the live steam fed in via the line 6. The suspension which contains the precipitated solids is discharged from the column via the line 7.

Figure 2:
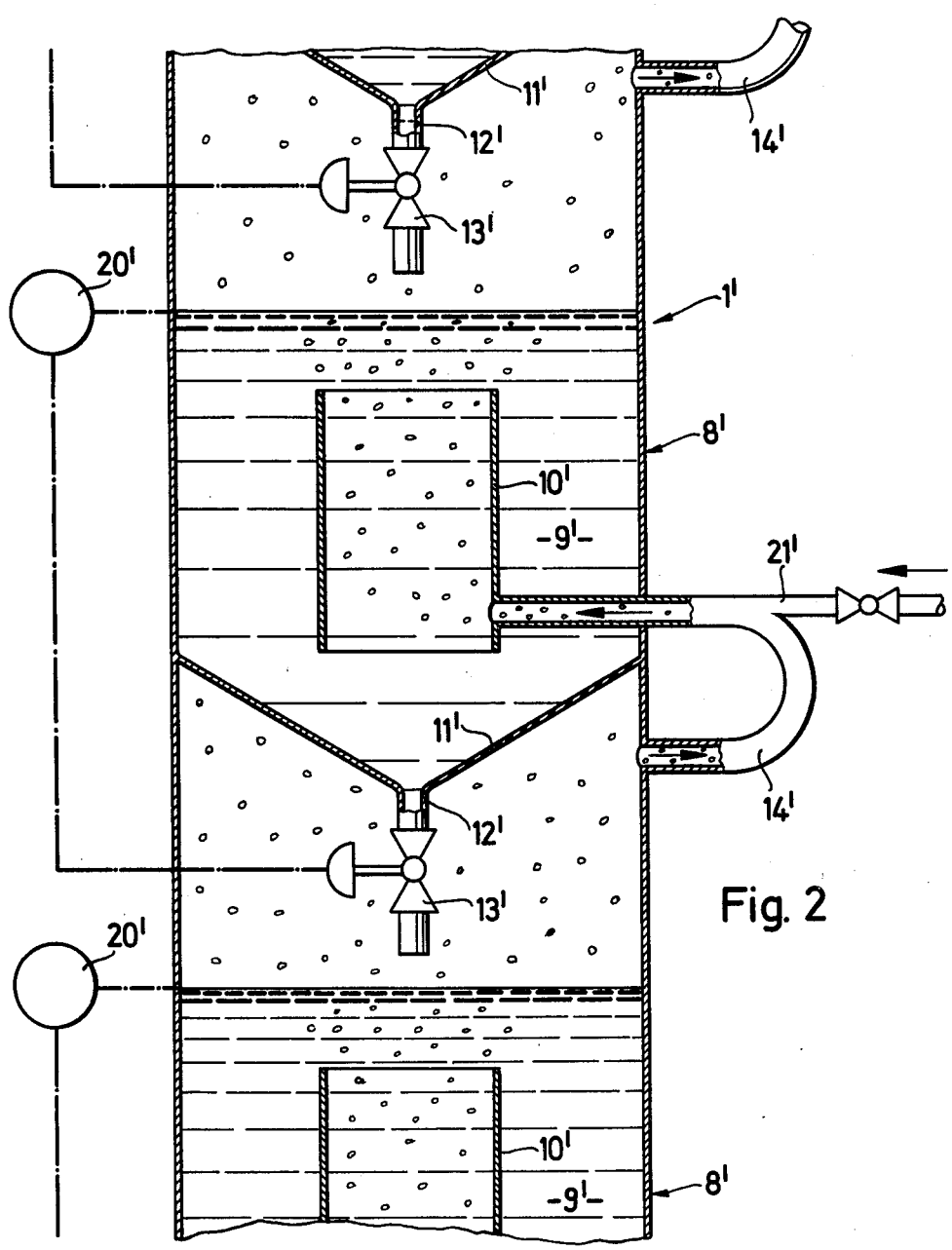
FIG. 2 illustrates a cross-sectional view of a modified stage of a stripping column in accordance with the invention.

Referring to FIG. 2 wherein the like components are indicated by like primed reference characters, the amount of discharge from each stage 8 can be controlled in dependence upon the type of liquid within the stage 8. To this end, a level control means 20' is provided to sense the height of liquid in each stage 8' and to emit a control signal to the valve 13' for opening and closing the valve in response to the height of liquid. In this way, the valve 13 can be controlled so as to maintain the height of liquid within the bubble bed at a constant level.

As shown in FIG. 2, a line 21' is connected to the steam line 14' to add live steam to the normal steam flow from stage-to-stage.

Figure 3:
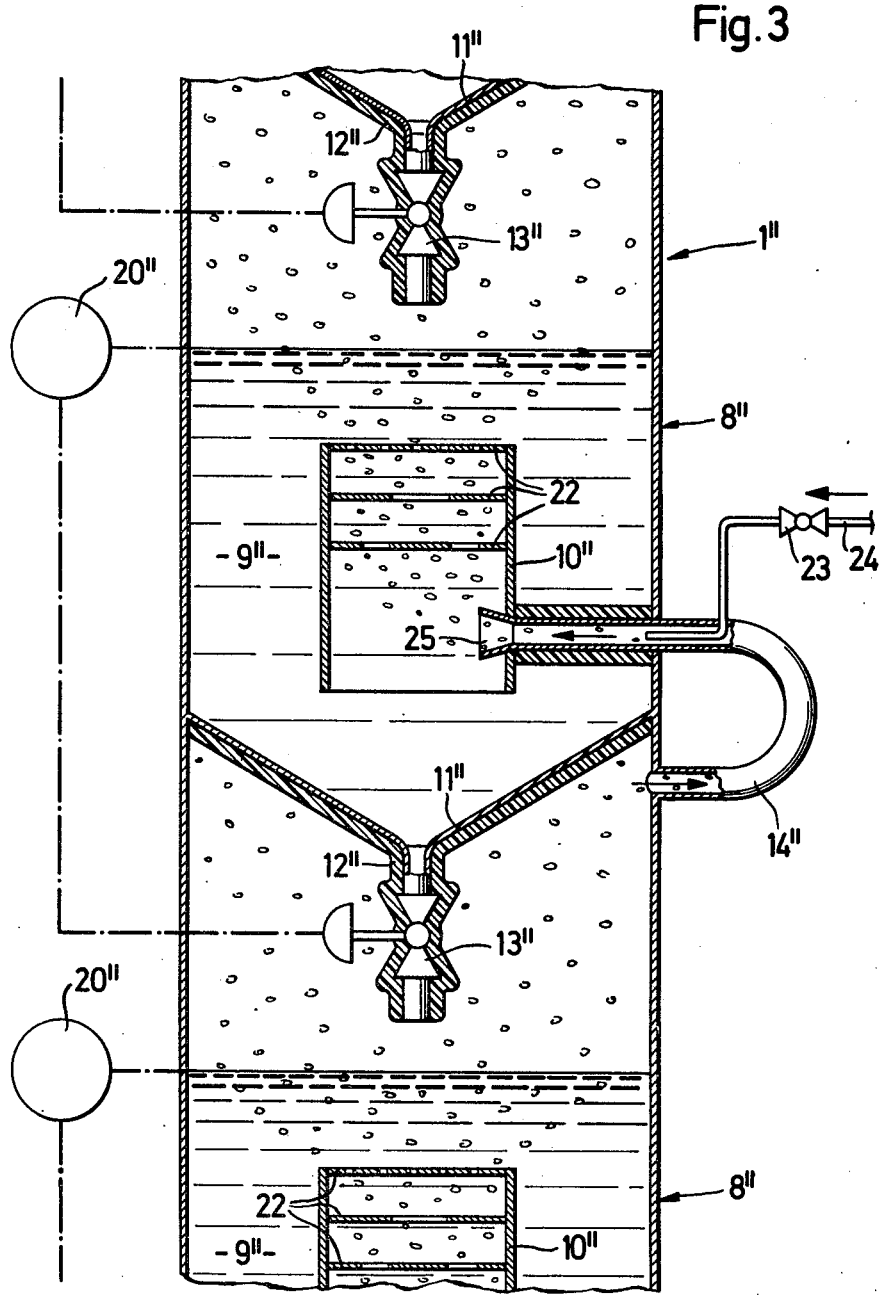
FIG. 3 illustrates a further modified stage of a stripping column provided with a cooling means in the steam lines.

Referring to FIG. 3, wherein like components as above are identified by like double prime reference characters, each of the pipes 10" includes a plurality of stationary mixing elements 22, for example, perforated plates. These plates 22 are disposed in spaced apart relation so as to improve the distribution effect of the steam within the pipe 10".

As shown, a line 24 equipped with a dosing valve 23 may be connected to each steam line 14" in order to inject a small amount of water for cooling purposes into the steam line 14" or for flushing away incrustations that may have occured in the pipe lines 14". In addition, the exit end 25 of each steam line 14" is outwardly flared to open into the chamber defined by the pipe 10". This avoids incrustations that may develop at this point.

Further, heat insulation is provided at least partially about each steam line 14" to the extent that the line is within the column 1" as well as along the plate 11", about the opening 12" and the valve 13".

Figure 4:
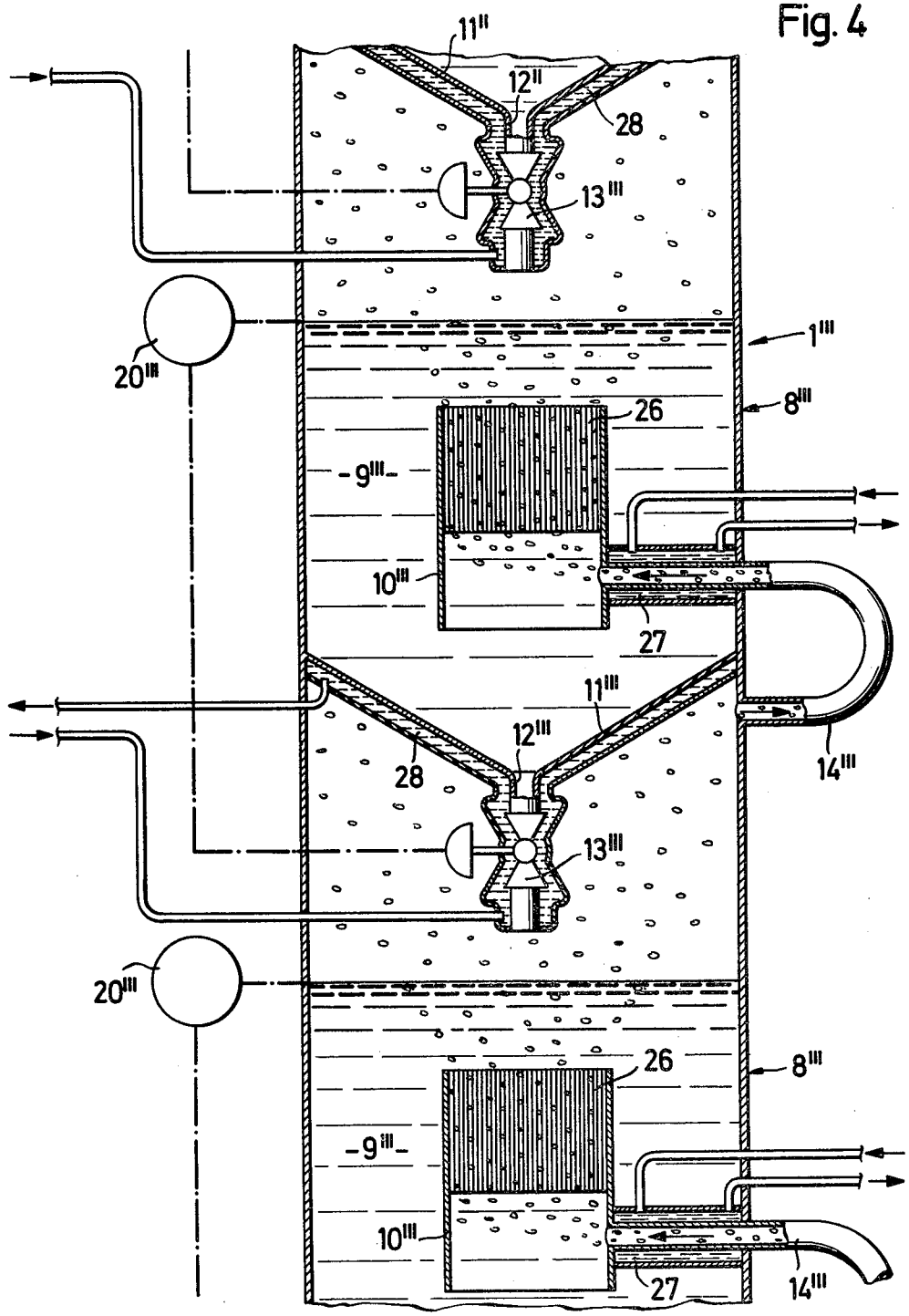
FIG. 4 illustrates a further modified stage of a stripping column having coolant jackets about the steam line, separating plate and outlets in accordance with the invention.

Referring to FIG. 4, wherein like components as above have been indicated by triple prime reference characters, each pipe 10''' is provided with at least one stationary mixing element 26 constructed in the manner described in Swiss Pat. No. 537,208. In addition, a coolant jacket is disposed at least partially about each steam line 14''' within the column 1'''. Similarly, similar coolant jackets for coolant are disposed adjacent each separating plate 11''' and about each outlet 12''' and valve 13'''. The coolant may be water and is circulated via suitable feed and discharge lines.

What is claimed is:
1. A stripping column comprising
a head section for receiving a metal salt-containing liquid;
a bottom section for receiving a supply of steam;
a plurality of reaction stages disposed between said head section and said bottom section to define bubble beds therein, each said stage including a separating plate defining a floor of a respective bubble bed, a vertical draft tube open at opposite ends within a respective bubble bed above said floor, an outlet in said separating plate to discharge liquid, and means for controlling the discharge of liquid through said outlet; and
at least one line communicating an upper end of each respective stage with the interior of said draft tube of the next uppermost stage of said stages to convey a flow of steam from said upper end to said respective draft tube.

2. A stripping column as set forth in claim 1 which further comprises a plurality of stationary mixing elements in each respective tube.

3. A stripping column as set forth in claim 2 wherein each mixing element is a perforated sheet.

4. A stripping column as set forth in claim 1 which further comprises a first counterflow column in said head section, a feed line connected to said counterflow column to feed a metal salt-containing liquid thereto, a discharge line connected to said counterflow column to discharge steam therefrom, a second counterflow column in said bottom section, a feed line connected to said second counterflow column to feed steam thereto, and a discharge line connected to said second counterflow column to discharge stripped liquid therefrom.

5. A stripping column as set forth in claim 1 wherein each respective line has an outwardly flared exit end opening into a respective draft tube.

6. A stripping column as set forth in claim 1 which further comprises an injection line in each respective line for injecting water into said respective line.

7. A stripping column as set forth in claim 1 which further comprises a coolant jacket at least partially about each respective line in each stage.

8. A stripping column as set forth in claim 1 which further comprises heat insulation at least partially about each respective line in each stage.

9. A stripping column as set forth in claim 1 wherein each separating plate is funnel-shaped and said outlet is disposed in a lower portion of said plate.

10. A stripping column as set forth in claim 1 which further comprises a coolant jacket adjacent each said separating plate.

11. A stripping column as set forth in claim 1 which further comprises a coolant jacket about each respective outlet.

12. A stripping column as set forth in claim 1 which further comprises heat insulation adjacent each respective separating plate and about each respective outlet.

13. A stripping column as set forth in claim 1 wherein said means for controlling the discharge of liquid includes a valve in a respective outlet and a means for opening and closing said valve in response to the height of liquid in each respective stage.

* * * * *